Patented Feb. 5, 1924.

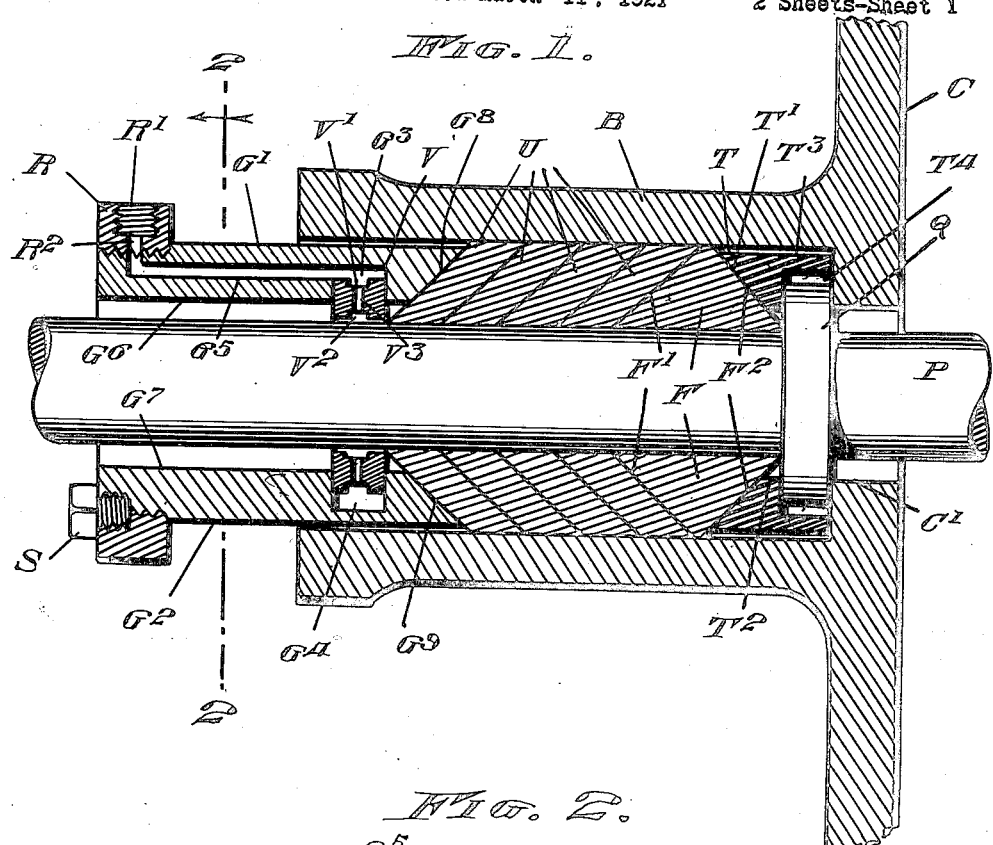
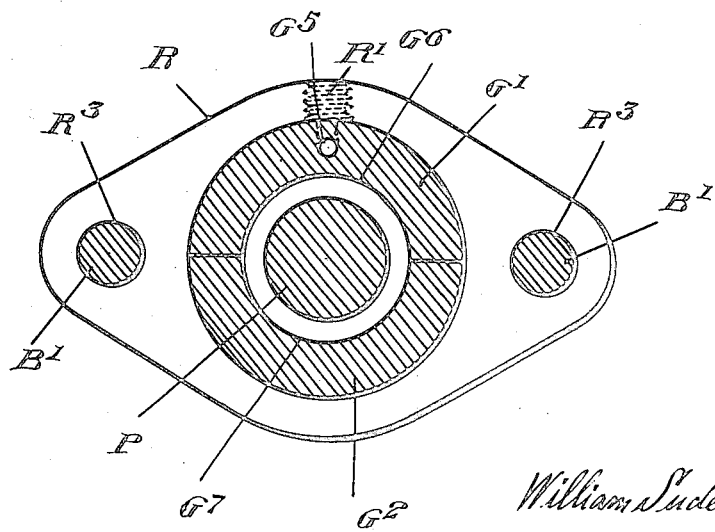

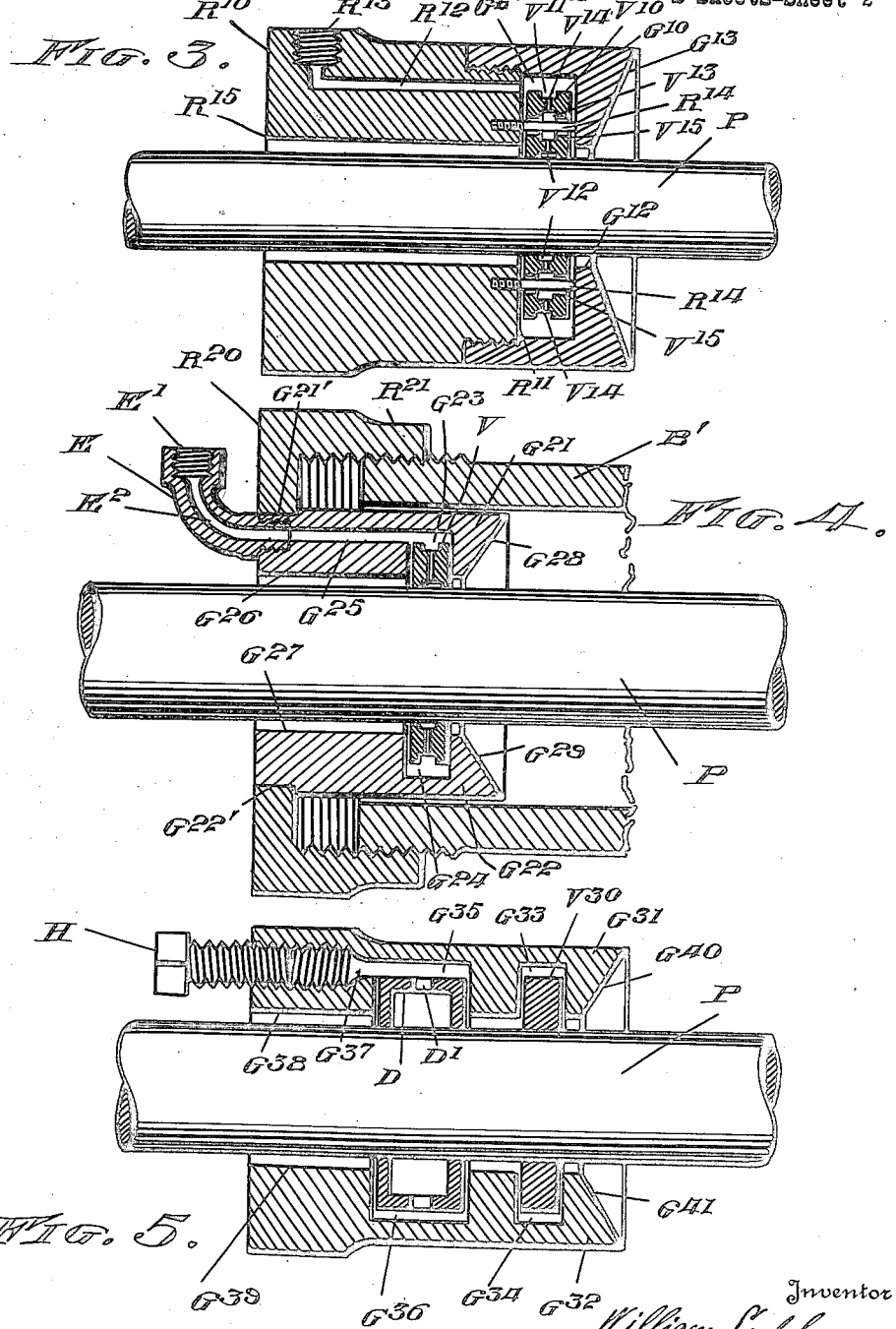

1,482,716

UNITED STATES PATENT OFFICE.

WILLIAM SUDEKUM, OF NASHVILLE, TENNESSEE.

PISTON-ROD PACKING.

Application filed March 11, 1921. Serial No. 451,618.

*To all whom it may concern:*

Be it known that I, WILLIAM SUDEKUM, a citizen of the United States, residing at Nashville, in the county of Davidson and State of Tennessee, have invented certain new and useful Improvements in Piston-Rod Packings, of which the following is a specification.

My invention consists in a new and useful improvement in piston rod packing and is designed to provide a device for packing stuffing boxes for pistons, which will obviate the scoring of piston rods due to their vibration in use. This desirable result is obtained by securing the proper packing of the stuffing box by elements that are so positioned in relation to the reciprocating piston rod that no rigidly fixed portion of the device can contact the piston.

A particularly advantageous feature of my device, in addition to the protection of the piston rod from the possibility of scoring, is the ease and simplicity in replacing such of the elements of the device as are subjected to wear in use. In my device, the wearing parts may be quickly and economically replaced without the necessity of tearing down the machine to which the device is applied, thus materially diminishing the period of time required for replacement, and consequently reducing the cost thereof.

The invention is embodied in the details of construction illustrated in the drawings and hereinafter fully described, but I do not consider my invention limited to the specific embodiment herein set forth and refer for its scope to the claims appended hereto.

In the drawings:

Fig. 1 is a vertical sectional view of a stuffing box provided with one form of my device.

Fig. 2 is a transverse section on the line 2—2 of Fig. 1, viewed in the direction indicated by the arrow.

Fig. 3 is a vertical section of a modified form of gland.

Fig. 4 is a vertical section of a modified form of gland adapted to be positioned in the stuffing box by means of a screw-cap.

Fig. 5 is a vertical section of a modified form of gland designed for use upon a stuffing box in which heavy grease may be used as a lubricant.

In Fig. 1, C indicates the cylinder to which my device is applied, and B is the stuffing box containing the packing. The cylinder C is provided with an opening $C^1$ for the passage of the piston rod P, which opening $C^1$ is sufficiently large to allow the piston rod P free movement without possibility of touching the wall of the cylinder C. Into the outer end of the stuffing box B there is inserted my novel gland composed of the complementary semi-circular portions $G^1$ and $G^2$. These portions are provided with semi-circular recesses $G^3$ and $G^4$ respectively formed in the inner faces of the portions $G^1$ and $G^2$ toward their ends extending into the stuffing box B. The portion $G^1$ which is placed above the portion $G^2$ is provided with an oil conduit $G^5$ extending from the outer end of the portion $G^1$ and communicating with the recess $G^3$. The recesses $G^3$ and $G^4$ are adapted to co-act to form a circular chamber in the gland, surrounding the piston rod P and which receives therein the vibrating ring V which closely surrounds the piston rod P. This ring V is provided upon its exterior and interior faces with circumferential channels $V^1$ and $V^2$ respectively. Radial bores $V^3$ connect these channels $V^1$ and $V^2$. This structure of the ring V provides means for the distribution of oil or other lubricating agent supplied through the conduit $G^5$ and recesses $G^3$ and $G^4$, to the piston rod P.

A retaining ring R provided with internal threads is adapted to be received upon external threads upon the outer ends of the portions $G^1$ and $G^2$ to form said portions into a unitary gland after the ring V has been inserted into the chamber formed by the recesses $G^3$ and $G^4$. A locking screw S is provided for locking said ring R upon the portions $G^3$ and $G^4$ when the parts are properly positioned. This ring R is provided with an internally threaded socket $R^1$ adapted to receive therein any suitable form of oil cup or other lubricant container, and which is connected by the conduit $R^2$ with the conduit $G^5$. The retaining ring R is provided with openings $R^3$ adapted to receive therethrough the bolts $B^1$ upon the stuffing box B. By the application of nuts (not shown) to the bolts $B^1$, the ring R and its accompanying gland may be bolted to the stuffing box B in the usual manner.

The portions $G^1$ and $G^2$ of my gland have interior semi-circular concave faces $G^6$ and $G^7$ which are spaced from the piston rod P when the gland is bolted in position. Thus it will be seen that it is not possible for any part of my gland to contact the piston rod P. The inner ends of the portions $G^1$ and $G^2$ are provided with the divergently beveled faces $G^8$ and $G^9$ respectively inclined at an angle of substantially 45° to the axis of the piston rod P. Within the stuffing box B and adjacent the faces $G^8$ and $G^9$, I provide a series of fibrous packing rings U, frusto-conical in form with their exterior faces parellel to the inner surface of the stuffing box B and their interior faces parallel with the piston rod P. (Four rings are shown in Fig. 1.) Adjacent this series of packing rings U is located a filler packing ring F having oppositely disposed frusto-conical faces $F^1$ and $F^2$, and adjacent this filler ring F is located a taper gland T having an inclined face $T^1$ shaped to conform to the face $F^2$ of the filler ring F. This gland T has an interior face $T^2$ spaced from the piston rod P so that it is not possible for any part of the gland T to contact the piston rod P. This gland T is provided with an annular shoulder $T^3$ which bears against the wall of the cylinder C and provides a recess $T^4$ within the end of the gland T at the inner end of the stuffing box B, in which recess $T^4$ is located the vibrating ring Q upon the piston rod P.

It will be obvious that the vibrating rings V and Q serve to maintain the packing between the packing glands when it is compressed.

In Figs. 3, 4 and 5 are shown modified forms of my improved gland, all of which are adapted to co-act with the other parts of my device illustrated in Fig. 1.

In Fig. 3, is shown a gland $G^{10}$ made in a single piece and provided with an interior circular recess $G^{11}$ to receive the vibrating ring $V^{10}$ which closely surrounds the piston rod P. This ring $V^{10}$ is provided upon its exterior and interior faces with the circumferential channels $V^{11}$ and $V^{12}$ respectively, and also with an interior channel $V^{13}$. Radial bores $V^{14}$ connect these channels $V^{11}$, $V^{12}$ and $V^{13}$. This gland $G^{10}$ is interiorly threaded upon its outer end and screwed upon the exteriorly threaded inner end of the retaining ring $R^{10}$ which is adapted to be bolted upon the stuffing box in the usual way. This ring $R^{10}$ has an inner face $R^{11}$ adapted to close the recess $G^{11}$ of the gland $G^{10}$ to form an oil chamber to enclose the ring $V^{10}$. The ring $R^{10}$ is provided with an oil conduit $R^{12}$ communicating with the recess $G^{10}$ and an interiorly threaded socket $R^{13}$ communicating with the conduit $R^{12}$, to receive therein an oil cup or other source of lubricant. The ring $R^{10}$ is further provided upon its face $R^{11}$ with brace studs $R^{14}$ tapped into said ring and adapted to pass through transverse openings $V^{15}$ in the ring $V^{10}$ provided for this purpose. These studs $R^{14}$ bear upon the gland $G^{10}$ when the ring $R^{10}$ is bolted in position and so prevent the ring $R^{10}$ from binding the ring $V^{10}$. The openings $V^{15}$ are sufficiently large as to allow the ring $V^{10}$ freedom of vibration, without interference by the studs $R^{14}$ passing therethrough. The inner face $G^{12}$ of the gland $G^{10}$, and the inner face $R^{15}$ of the ring $R^{10}$ are spaced from the piston rod P when the parts are in position so that no part of the gland or ring can contact the piston rod P. The gland $G^{10}$ is provided with an inner beveled face $G^{13}$ inclined in the same way as the inner faces $G^8$ and $G^9$ of the two-piece gland shown in Fig. 1, and for the same purpose.

In Fig. 4, is shown a form of two-piece gland similar to that shown in Fig. 1, and adapted to be placed in position by means of a screw-cap instead of a bolted-on retaining ring. In this form of gland there are two portions $G^{21}$ and $G^{22}$ having interior semi-circular recesses $G^{23}$ and $G^{24}$ respectively which together form a chamber to receive a vibrating ring V such as is shown in Fig. 1. The portion $G^{21}$ is provided with an oil conduit $G^{25}$ communicating with the recess $G^{23}$. Into the outer end of the portion $G^{21}$ there is tapped an elbow E having an interiorly threaded socket $E^1$ to receive an oil cup or other source of lubricant, and connected by an oil conduit $E^2$ with the conduit $G^{25}$. The portions $G^{21}$ and $G^{22}$ are provided upon their outer ends with slightly reduced portions $G^{21'}$ and $G^{22'}$ respectively upon which the screw-cap $R^{20}$ is adapted to seat. This cap $R^{20}$ has an interiorly threaded end $R^{21}$ which may be screwed upon the exteriorly threaded outer end of the stuffing box B', thus drawing the gland into proper position in the stuffing box B'. The interior semi-circular concave faces $G^{26}$ and $G^{27}$ of the portions $G^{21}$ and $G^{22}$ respectively are spaced from the piston rod P when the gland is screwed into proper position, so that it is not possible for any part of the gland to contact the piston rod P. The inner ends of the portions $G^{21}$ and $G^{22}$ are provided with the beveled faces $G^{28}$ and $G^{29}$ respectively, in the same manner as the portions $G^1$ and $G^2$ shown in Fig. 1 and for the same purpose.

In Fig. 5 is shown a form of two-piece gland intended to be used for packing a stuffing box in which heavy grease or "dope" may be used as a lubricant instead of a fluid oil. In this form of gland there are two portions $G^{31}$ and $G^{32}$ provided with the interior semi-circular recesses $G^{33}$ and $G^{34}$ respectively which together form a chamber to receive therein the vibrating ring $V^{30}$ which is similar in form to the vibrating ring Q in Fig. 1. The portions $G^{31}$ and $G^{32}$ are also provided with the interior semi-circular recesses $G^{35}$ and $G^{36}$ which together form a chamber to receive therein a vibrating lubricating ring D which is hollow and provided with radial bores $D^1$. The portion $G^{31}$ is provided with a bore $G^{37}$ communicating with the recess $G^{35}$ and threaded at its outer end adjacent the outer face of the portion $G^{31}$, and provided with the grease screw-plug H for forcing heavy grease or "dope" into the lubricating chamber and the ring D therein. The portions $G^{31}$ and $G^{32}$ have interior semi-circular concave faces $G^{38}$ and $G^{39}$ respectively which are spaced from the piston rod P when the gland is properly positioned, so that no part of the gland can contact the piston rod P. The inner ends of the portions $G^{31}$ and $G^{32}$ are provided with beveled faces $G^{40}$ and $G^{41}$ respectively, in the same manner as the other glands already described. The form of gland shown in Fig. 5 may be applied to the stuffing box by means of either the bolted-up retaining ring, such as is shown in Fig. 1, or by a screw-cap, such as is shown in Fig. 4.

Having described my invention, what I claim is:

1. In a piston rod stuffing box packing, the combination of a compressible packing medium adapted to contact the piston rod; a seat ring mounted in the stuffing box; a vibrating ring mounted in said seat ring; a packing gland adapted to compress between itself and said seat ring the compressible packing medium and also to be rigidly attached to said stuffing box, said seat ring and said gland being provided with inner surfaces spaced from the piston rod, said surface of said gland being provided with a groove; and a vibrating ring mounted upon said piston rod in said groove.

2. In a stuffing box, the combination of a seat ring provided with an interior face; a groove in said face; a vibrating ring in said groove; a packing gland provided with an interior face; a groove in said face; a vibrating ring in said groove; and a compressible packing medium between said seat ring and said gland.

3. In a stuffing box, the combination of a seat ring provided with an interior face; a groove in said face; a vibrating ring in said groove; a packing gland provided with an interior face and a lubricating conduit; a groove in said face communicating with said conduit; a vibrating ring in said groove provided with a lubricating conduit; and a compressible packing medium between said seat ring and said gland.

In testimony whereof I affix my signature.

WILLIAM SUDEKUM.